United States Patent
Chen

(10) Patent No.: US 7,948,849 B2
(45) Date of Patent: May 24, 2011

(54) REMOVABLE STORAGE DEVICE WITH VIBRATION REDUCTION STRUCTURE

(75) Inventor: Chun-Ming Chen, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 315 days.

(21) Appl. No.: 12/277,310

(22) Filed: Nov. 25, 2008

(65) Prior Publication Data
US 2010/0002557 A1 Jan. 7, 2010

(30) Foreign Application Priority Data
Jul. 7, 2008 (TW) ............................. 97125546 A

(51) Int. Cl. *G11B 33/02* (2006.01)
(52) U.S. Cl. ........................................ 369/75.11
(58) Field of Classification Search ............... 369/75.11
See application file for complete search history.

(56) References Cited

U.S. PATENT DOCUMENTS

| | | | | |
|---|---|---|---|---|
| 5,745,471 | A * | 4/1998 | Son et al. | 720/694 |
| 6,304,440 | B1 * | 10/2001 | Lin | 361/679.34 |
| 6,477,042 | B1 * | 11/2002 | Allgeyer et al. | 361/679.34 |
| 6,501,645 | B1 | 12/2002 | Hanazawa | |
| 6,785,217 | B1 | 8/2004 | Kao et al. | |
| 6,834,393 | B2 * | 12/2004 | Akimaru et al. | 720/698 |
| 7,092,251 | B1 * | 8/2006 | Henry | 361/679.36 |
| 7,315,447 | B2 * | 1/2008 | Inoue et al. | 361/679.48 |
| 7,342,743 | B2 * | 3/2008 | Kuwajima | 360/97.02 |

* cited by examiner

*Primary Examiner* — Mark Blouin
(74) *Attorney, Agent, or Firm* — Winston Hsu; Scott Margo

(57) ABSTRACT

A removable storage device includes a base including a first frame and a second frame connected to a first frame. A containing space is formed on the second frame. A first connector is disposed on an end of the second frame. A height difference is formed between the first frame and the second frame. The removable storage device further includes a storage module installed on the first frame. A second connector is disposed on an end of the storage module. The removable storage device further includes a cable. One end of the cable is connected to the first connector, and the other end of the cable is connected to the second connector. A part of the cable is contained in the containing space of the second frame.

10 Claims, 3 Drawing Sheets

REMOVABLE STORAGE DEVICE WITH VIBRATION REDUCTION STRUCTURE

BACKGROUND OF THE INVENTION

1. Field of the Invention

The present invention relates to a removable storage device, and more particularly, to a removable storage device with vibration reduction structure.

2. Description of the Prior Art

People have to take apart computers when replacing broken components or upgrading instruments inside the computer. So computers capable of being disassembled easily are necessary. It is also inconvenient for users to disassemble a storage device such as a hard disk drive from a computer.

Please refer to FIG. 1. FIG. 1 is a diagram of a removable storage device 10 in the prior art. The removable storage device 10 includes a base 12 for containing a storage module 14, such as a hard disk drive. The removable storage device 10 further includes a supporting shelf 16 disposed on the base 12 for supporting the storage module 14. There is a plurality of dampers 18 disposed on the base 12 and connected to the supporting shelf 16 and the base 12 for absorbing vibration of the supporting shelf 16. A first connector 20 is installed on an end of the base 12 for connecting with a connector of a computer (not shown in FIG. 1) capable of containing the removable storage device 10. A second connector 22 is installed on an end of the storage module 14. A cable 24 is utilized for connecting the first connector 20 and the second connector 22. The first connector 20 and the second connector 22 can be power connectors respectively, and the cable 24 can be a power cable correspondingly. The first connector 20 and the second connector 22 also can be signal connectors respectively, and the cable 24 can be a signal cable correspondingly. That is, the cable 24 is capable of transmitting electricity or signals between the storage module 14 and the computer. Besides, the connection of the first connector 20 and the second connector 22 via the cable 24 can avoid transmitting vibration to the storage module 14 directly due to a rigid connection so as to protect the storage module 14. However the cable 24 is compressed within a limited mechanical space so as to reduce service life of the cable 24 due to hardening effect. The vibration can be transmitted to the storage module 14 via the hardening cable 24 so as to reduce shock-isolating efficiency.

SUMMARY OF THE INVENTION

According to the claimed invention, a removable storage device includes a base including a first frame and a second frame connected to a first frame. A containing space is formed on the second frame. A first connector is disposed on an end of the second frame. A height difference is formed between the first frame and the second frame. The removable storage device further includes a storage module installed on the first frame. A second connector is disposed on an end of the storage module. The removable storage device further includes a cable. One end of the cable is connected to the first connector, and the other end of the cable is connected to the second connector. A part of the cable is contained in the containing space of the second frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
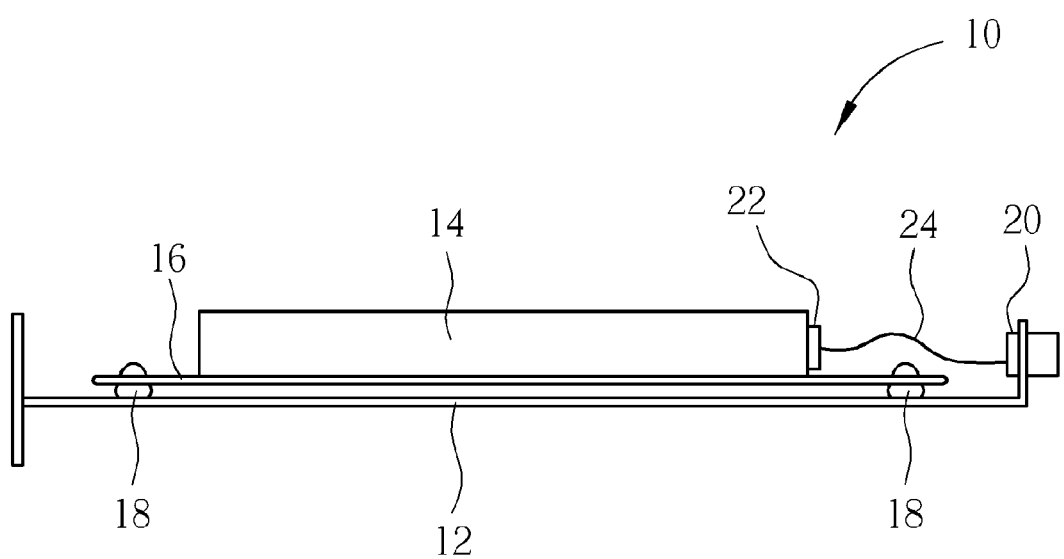
FIG. 1 is a diagram of a removable storage device in the prior art.
Figure 2:
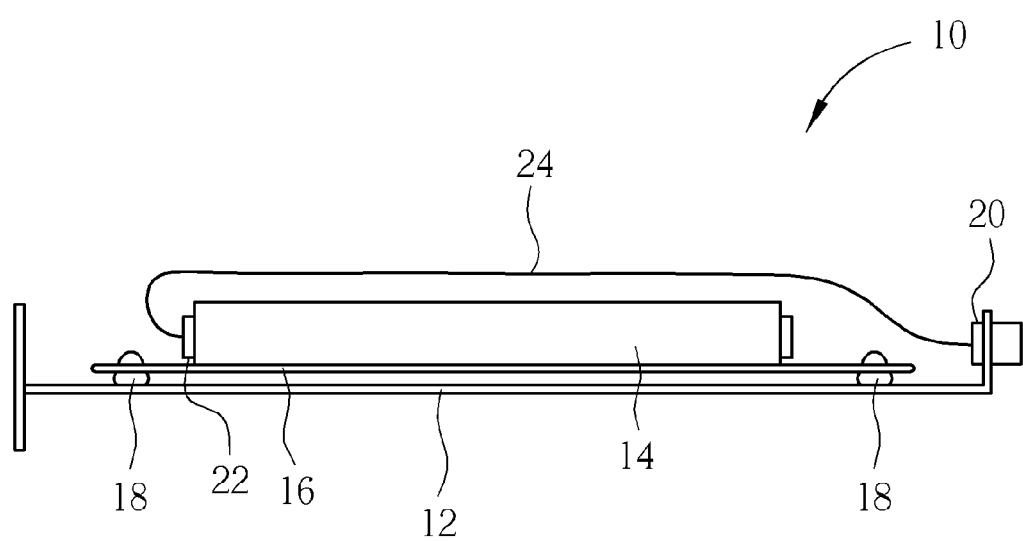
FIG. 2 is another diagram of the removable storage device in the prior art.
Figure 3:
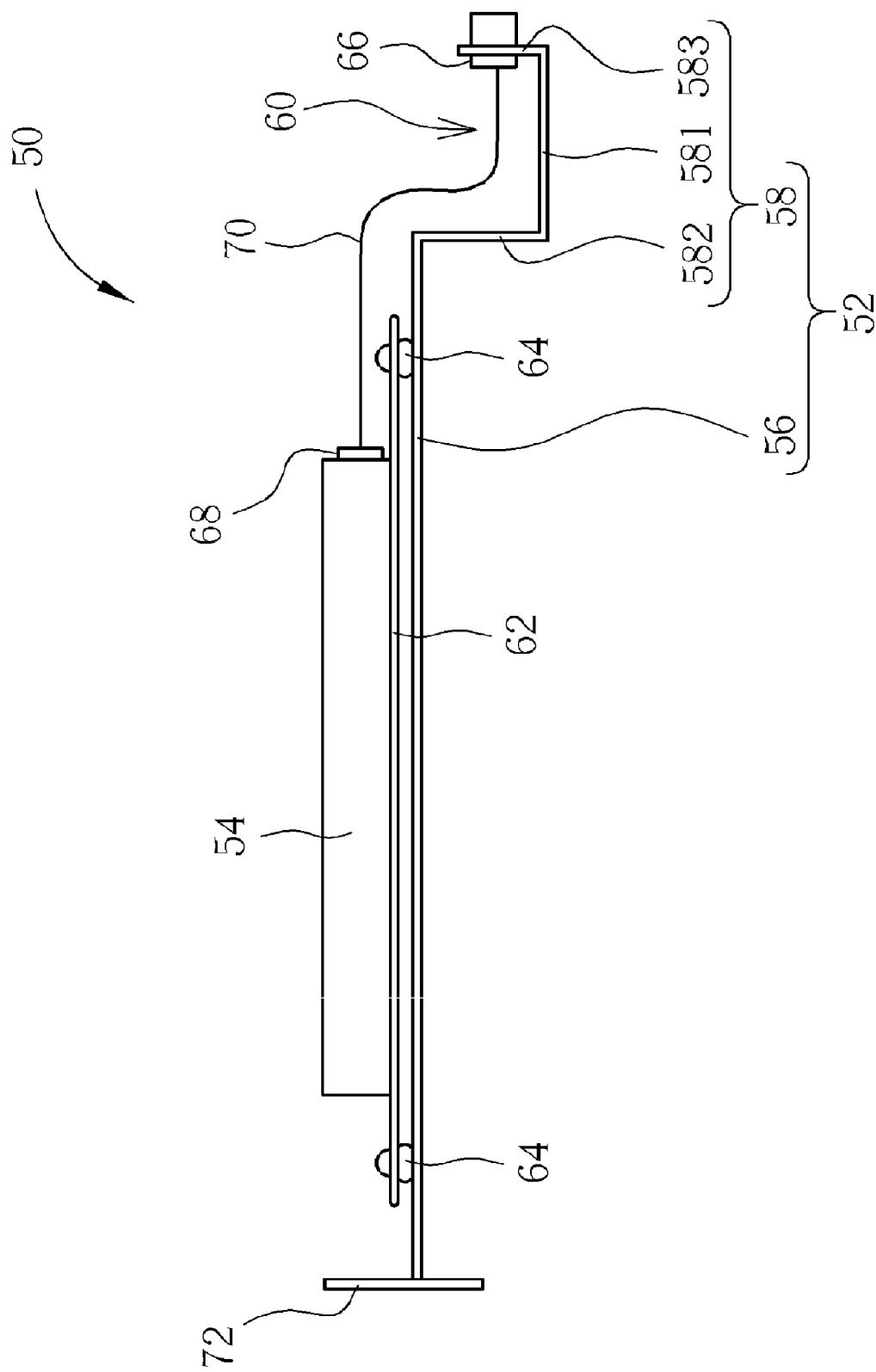
FIG. 3 is a diagram of a removable storage device according to a preferred embodiment of the present invention.

Please refer to FIG. 3. FIG. 3 is a diagram of a removable storage device 50 according to a preferred embodiment of the present invention. The removable storage device 50 includes a base 52 for containing a storage module 54, such as a hard disk drive. The base 52 includes a first frame 56, and a second frame 58 connected to the first frame 56. A containing space 60 is formed on the second frame 58, and a height difference is formed between the first frame 56 and the second frame 58. The removable storage device 50 further includes a supporting shelf 62 disposed on the first frame 56 for supporting the storage module 54. There is a plurality of dampers 64 disposed on the first frame 56 and connected to the supporting shelf 62 and the first frame 56 12 for absorbing vibration of the supporting shelf 62. A first connector 66 is disposed on an end of the second frame 58 for connecting with a connector of a computer (not shown in FIG. 3) capable of containing the removable storage device 50. A second connector 68 is installed on an end of the storage module 54. A cable 70 is utilized for connecting the first connector 66 and the second connector 68. The first connector 66 and the second connector 68 can be power connectors respectively, and the cable 70 can be a power cable correspondingly. The first connector 66 and the second connector 68 also can be signal connectors respectively, and the cable 70 can be a signal cable correspondingly, such as a signal cable conforming to SATA, USB, SAS interfaces, and so on. That is, the cable 70 is capable of transmitting electricity or signals between the storage module 54 and the computer. A handle 72 is disposed on an end of the first frame 56 of the case 52 so that a user can draw the removable storage device 50 by the handle 72. The handle 72 can be a covering.

The second frame 58 includes a bottom plate 581, a first lateral plate 582, and a second lateral plate 583. A first lateral plate 582 is connected to a side of the bottom plate 581 and the first frame 56. The second lateral plate 583 is connected to the other side of the bottom plate 581. The first connector 68 is disposed on the second lateral plate 583. The first lateral plate 582 and the second lateral plate 583 can be perpendicular to the bottom plate 581 substantially. The second lateral plate 583 can be disposed selectively, and the first connector 68 can be disposed on the bottom plate 581 directly. The containing space 60 is formed by the bottom plate 581, the first lateral plate 582, and the second lateral plate 583 together. There is the height different between the containing space 60 and the first frame 56 because of the disposition of the first lateral plate 582. Therefore, a part of the cable 70 can be bent for being contained in the containing space 70 of the second frame 58 so that the cable 70 can not be compressed resulting in hardening and a length of the cable 70 can be increased so as to increase shock-isolating efficiency. Additionally, the cable 70 receiving inside the containing space 60 can not interfere with other components, and the problems of arranging the cable with long length and applying an additional fixture for fixing the cable are solved so as to increase convenience of assembly and to reduce manufacture cost.

The present invention utilizes the height difference between the second frame 58 supporting the second connector 68 and the first frame 56 supporting the storage module 54 for lengthening the length of the cable 70 50 as to reduce possibility of hardening the cable 70. The containing space 60 formed on the second frame 58 provides a transition space for receiving the bent cable 70, and the cable 70 is capable of smoothly passing through the height difference between the second frame 58 and the first frame 56 at small curvature. In addition, the second frame 58 also can be disposed above the first frame 56 so that there is a height difference between the first frame 56 and the second frame 58. The working principle is the same as the above-mentioned embodiment, hence it is not reiterated.

In contrast to the prior art, the removable storage device of the present invention provides a transition space for receiving the bent cable so as to prevent the cable from being compressed. It can lengthen the length of the cable for reducing possibility of hardening the cable and isolating the storage module from vibration effectively. In addition, the cable receiving inside the containing space can not interfere with other components, and the problems of arranging the cable with long length and applying an additional fixture for fixing the cable are solved. It can increase convenience of assembly and can reduce manufacture cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A removable storage device comprising:
   a base comprising:
   a first frame; and
   a second frame connected to the first frame, a containing space being formed on the second frame, a height difference being formed between the first frame and the second frame, and the second frame comprising:
   a bottom plate;
   a first lateral plate connected to a side of the bottom plate and the first frame; and
   a second lateral plate connected to the other side of the bottom plate, a first connector being disposed on the second lateral plate;
   a storage module installed on the first frame, a second connector being disposed on an end of the storage module; and
   a cable, one end of the cable being connected to the first connector, the other end of the cable being connected to the second connector, and a part of the cable being contained in the containing space of the second frame.

2. The removable storage device of claim 1 further comprising a supporting shelf disposed on the first frame for supporting the storage module.

3. The removable storage device of claim 2 further comprising at least one damper connected to the support shelf and the first frame for absorbing vibration.

4. The removable storage device of claim 1 wherein the first lateral plate is perpendicular to the bottom plate substantially.

5. The removable storage device of claim 1 wherein the second lateral plate is perpendicular to the bottom plate substantially.

6. The removable storage device of claim 1 wherein a handle is disposed on an end of the first frame.

7. The removable storage device of claim 1 wherein the part of the cable is bent for being containing in the containing space of the second frame.

8. The removable storage device of claim 1 wherein the storage module is a hard disk drive.

9. The removable storage device of claim 1 wherein the first connector and the second connector are power connectors respectively, and the cable is a power cable.

10. The removable storage device of claim 1 wherein the first connector and the second connector are signal connectors respectively, and the cable is a signal cable.

* * * * *